United States Patent
Zhang et al.

(10) Patent No.: US 10,866,335 B2
(45) Date of Patent: Dec. 15, 2020

(54) FORMATION CLAY TYPING FROM ELECTROMAGNETIC MEASUREMENTS

(71) Applicants: SCHLUMBERGER TECHNOLOGY CORPORATION, Sugar Land, TX (US); Saudi Arabian Oil Company, Dhahran (SA)

(72) Inventors: Ping Zhang, Al-Khobar (SA); Wael Abdallah, Al-Khobar (SA); Shouxiang Ma, Dhahran (SA); Chengbing Liu, Dhahran (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 21 days.

(21) Appl. No.: 16/041,454

(22) Filed: Jul. 20, 2018

(65) Prior Publication Data

US 2020/0025967 A1 Jan. 23, 2020

(51) Int. Cl.
*G01V 3/30* (2006.01)
*G01V 5/04* (2006.01)
*G01N 24/08* (2006.01)
*G01V 3/32* (2006.01)

(52) U.S. Cl.
CPC ............. *G01V 3/30* (2013.01); *G01N 24/081* (2013.01); *G01V 3/32* (2013.01); *G01V 5/04* (2013.01)

(58) Field of Classification Search
CPC ... G01V 3/30; G01V 3/32; G01V 5/04; G01N 24/081
USPC .......................................................... 324/338
See application file for complete search history.

(56) References Cited

U.S. PATENT DOCUMENTS

| | | | |
|---|---|---|---|
| 4,584,874 A | 4/1986 | Ruhovets | |
| 4,769,606 A * | 9/1988 | Vinegar | G01V 3/38 324/341 |
| 4,903,527 A | 2/1990 | Herron | |
| 4,953,399 A | 9/1990 | Fertl et al. | |
| 6,646,437 B1 | 11/2003 | Chitale et al. | |
| 7,812,609 B2 * | 10/2010 | Martinez | G01V 3/28 324/339 |
| 2008/0100942 A1 | 5/2008 | Meier et al. | |
| 2008/0290874 A1 | 11/2008 | Seleznev et al. | |
| 2010/0259415 A1 | 10/2010 | Strachan et al. | |

(Continued)

FOREIGN PATENT DOCUMENTS

WO 2018063195 A1 4/2018

OTHER PUBLICATIONS

Zhang et al.; "Application of OpenMP to Wireline Triaxial Induction Logging in 1D Layered Anisotropic Medium"; Pub. Date Sep. 26, 2011; International Journal of Antennas and Propagation; vol. 2012, Article ID 864748; p. 1-12 (Year: 2011).*

(Continued)

*Primary Examiner* — Nasima Monsur
*Assistant Examiner* — Rahul Maini

(57) ABSTRACT

An array electromagnetic tool is run in a borehole, and resulting signals are processed to provide at least one of real and imaginary conductivity components, $\sigma^{R*}$ and $\sigma^{I*}$. The at least one of real and imaginary conductivity components is compared to a corresponding representative conductivity component of a plurality of different clay groups and a determination of clay type in the formation is made therefrom.

20 Claims, 5 Drawing Sheets

(56) References Cited

U.S. PATENT DOCUMENTS

2012/0192640 A1 8/2012 Minh et al.
2015/0204997 A1 7/2015 Cuevas et al.
2016/0097876 A1* 4/2016 Freed .................. G01V 3/24
                                                                703/2
2018/0100942 A1 4/2018 Zhang et al.

OTHER PUBLICATIONS

Revil et al.; "Low-frequency complex conductivity of sandy and clayey materials"; Pub. Date Feb. 13, 2013; Journal of Colloid and Interface Science; 398 (2013); 193-209 (Year: 2013).*
Fertl et al.; "Type and distribution modes of clay mineral from well logging data"; Pub. Date Jan. 1990; Journal of Petroleum Science and Engineering; vol. 3, Issue 4 (Year: 1990).*
Anderson, et al., "Triaxial Induction—A New Angle for an Old Measurement", Oilfield Review, 2008, pp. 64-84.
Bhuyan, K. et al., "Clay Estimation From Gr and Neutron-Density Porosity Logs", SPWLA-1994-DDD, SPWLA 35th Annual Logging Symposium, Tulsa, Oklahoma, USA, 1994, 15 pages.
Leroy, P. et al., "A triple-layer model of the surface electrochemical properties of clay minerals", Journal of Colloid and Interface Science, 2004, 270, pp. 371-380.
Revil, A., "Spectral induced polarization of shaly sands: Influence of the electrical double layer", Water Resources Research, 2012, 48, W02517, 23 pages.
International Search Report and Written Opinion for corresponding PCT Application Serial No. PCT/US2019/042334, dated Nov. 6, 2019, 10 pages.

* cited by examiner

FORMATION CLAY TYPING FROM ELECTROMAGNETIC MEASUREMENTS

FIELD OF THE DISCLOSURE

The subject disclosure relates to formation evaluation. More particularly, the subject disclosure relates to methods of using array electromagnetic tools in determining the type of clay contained in a formation.

BACKGROUND

The presence of clays in formations containing hydrocarbon reservoirs can significantly impact estimates of reserves and producibility. The presence of clay minerals complicates determinations of porosity and saturation, and it is also known that permeability is very sensitive to even low levels of specific clay minerals in the pore space, such as illite. Without specific knowledge of the clay minerals present, there is a risk of impairing the permeability of a reservoir through the introduction of improper fluids during production.

Different approaches have been used in an attempt to identify clay minerals in formation. For example, nuclear magnetic resonance (NMR) logging has been used to define water absorbed by clay minerals, i.e., the clay bound fluid; see, e.g., U.S. Pat. No. 6,646,437, where measurements are used to determine the quantity of adsorbed water in different clays and to correct previously available data obtained using conventional density and neutron porosity logs. As another example, a density-neutron log cross-plot technique has been used as a method for qualitatively determining clay content in oil and water saturated shaly sands. See Bhuyan, K. et al., "Clay Estimation From Gr And Neutron-Density Porosity Logs," SPWLA-1994-DDD, SPWLA 35th Annual Logging Symposium, 19-22 June, Tulsa, Okla. (1994). Perhaps the most accurate clay typing and quantification technology is the LITHO SCANNER® (a trademark of Schlumberger) tool which uses gamma ray spectroscopy in order to measure key elements in a wide variety of rock formations which may be correlated to the mineralogy of the formation, including clay content. See, e.g., U.S. Pat. No. 4,903,527 to Herron.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In embodiments, array electromagnetic (AEM) measurements are used to identify some of the most common clays encountered in petroleum reservoirs. An array electromagnetic tool is run in a borehole, and resulting signals are processed to provide real and/or imaginary conductivity components, $\sigma^{R*}$ and $\sigma^{I*}$. The real and/or imaginary conductivity components are compared to a corresponding representative conductivity component of a plurality of different clay groups, and a determination of clay type in the formation is made therefrom.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Figure 4:
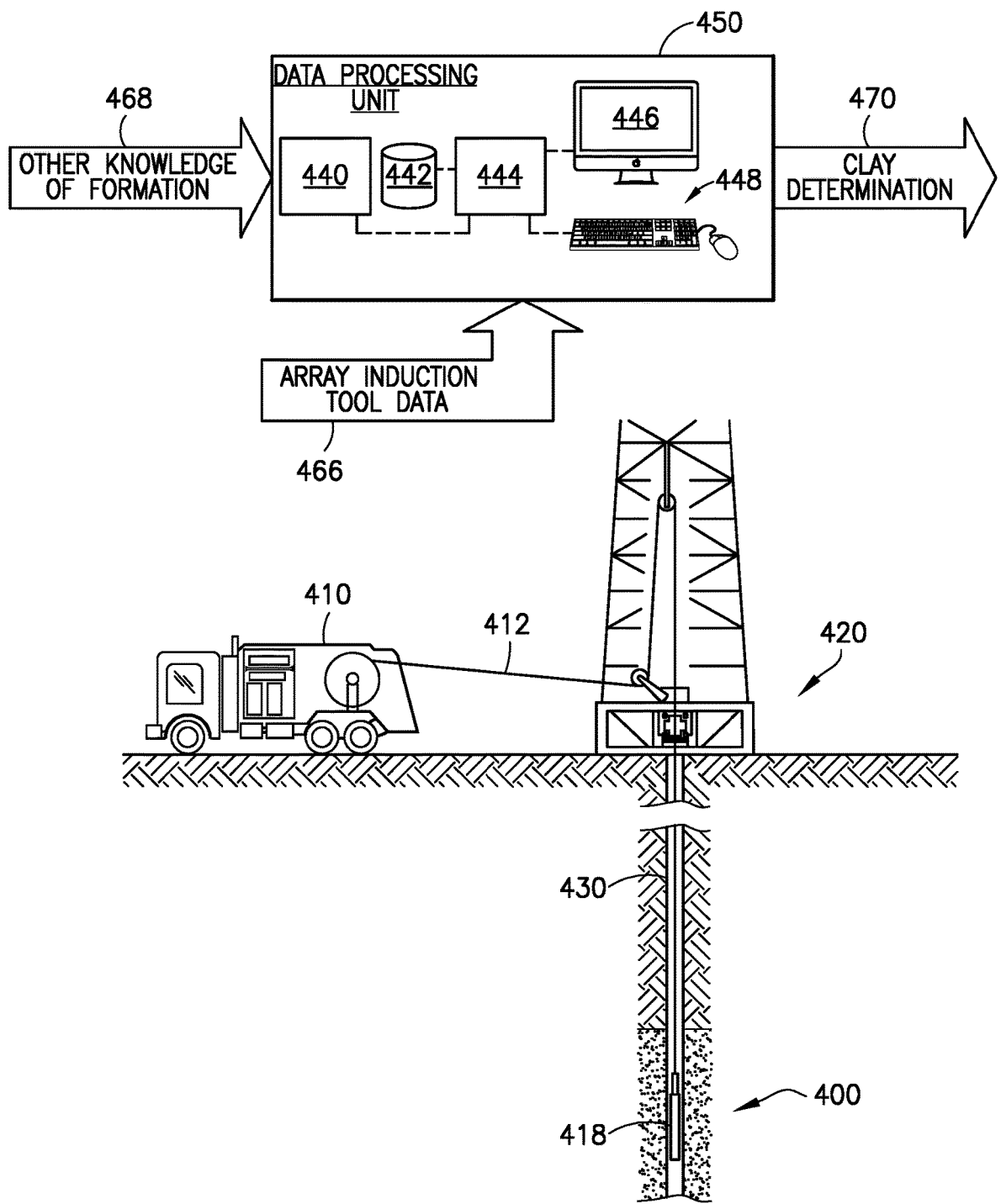
FIG. 4 is a diagram showing an array induction logging tool in a borehole.

According to embodiments, array electromagnetic (AEM) measurements are used to identify some of the most common clays encountered in petroleum reservoirs. As will be appreciated, AEM measurements are acquired in almost every vertical and slightly deviated well that is drilled. Tools such as the Array Induction Tool® (AIT—a trademark of Schlumberger) discussed hereinafter with reference to FIG. 4, are often used to obtain the AEM measurements.

Figure 1:
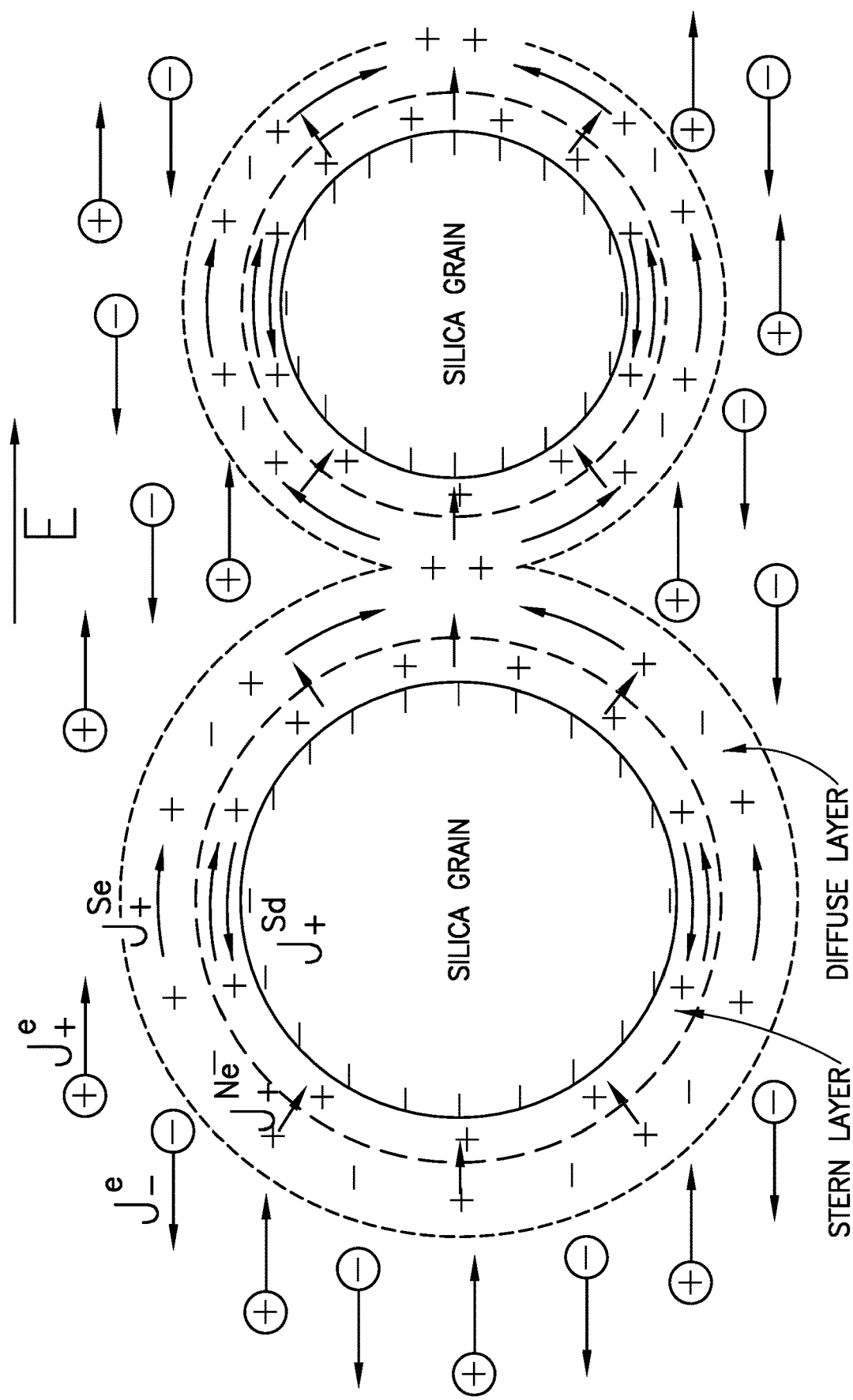
FIG. 1 is a diagram showing the interfacial polarization of clay minerals with electrical double layers.

According to one aspect, various clay minerals can be lumped, on the basis of molecular structure and composition, into four most commonly encountered and representative groups in petroleum reservoirs: kaolinite, illite, chlorite and smectite. Although each clay group impacts formation conductivity differently, the fundamental mechanism is similar. When the surface of a clay mineral grain is exposed to electrolytes, it acquires charges due to ionic adsorption, protonation/deprotonation of the hydroxyl groups, and dissociation of other potentially active surface groups. See, Leroy, P., and A. Revil, "A triple layer model of the surface electrochemical properties of clay minerals", *Journal of Colloid and Interface Science*, 270, 371-380 (2004). Under external electromagnetic (EM) fields, both electrical conduction (due to charge carries) and interfacial polarization (due to surface charges) co-exist, and the measured EM fields are influenced by both effects. Electrical conduction describes the movement of the charge carried under the influence of the external EM fields. This is a well understood phenomena and can be described by Ohm's law. The polarization of clay particles is mostly due to charge accumulation and movements at host-inclusion interfaces. The most common theory to describe this interfacial polarization is the electrical double layer theory. According to that theory, and as shown in FIG. 1, both Stern and diffuse layers are formed at the surface of the clay particles due to charge absorptions and movements. In the presence of an externally applied electric field, the double layer develops a counter ion cloud and diffused-charge distributions around host-inclusion interfaces. Dynamics of accumulation/depletion of charge concentrations around host-inclusion interfaces influence the magnitude and phase of the EM response of a reservoir formation containing clay minerals.

The formation electrical property may be described by complex conductivity:

$$\sigma = \sigma^R + \sigma^I \qquad (1)$$

where $\sigma^R$ is the in-phase component and $\sigma^I$ is the quadrature (out-of-phase) component of the total conductivity, respectively. For a porous media containing clay minerals, this total conductivity depends on conductivity of pore fluid, fluid saturation, ion mobility and cation exchange capacity (CEC) of clay inclusions. The in-phase and quadrature components have different relationships with these parameters (see, Revil, A., "Spectral induced polarization of shaly sands: Influence of the electrical double layer", *Water Resources Research*, Vol 48, W02517 (2012)), such that $$\sigma^R = \frac{S_w^{n_0}}{F}\left[\sigma_w + \frac{2m_0\beta_+ + \rho_g CEC}{3}(F-1)\right] \qquad (2)$$

where $\sigma_w$ represents formation water conductivity, $\rho_g$ represents matrix grain density, $\beta_+$ is the mobility of a counterion in the formation fluid, F is the electric formation factor defined according to $F=\phi^{-m_0}$, where $\phi$ is the porosity and $m_0$ is a cementation exponent for a shaly formation, $S_w$ is the water saturation, and $n_0$ is a saturation exponent; and $$\sigma^I = \tfrac{2}{3}\beta_+^s f \rho_g S_w^{n_0-1} CEC \qquad (3)$$

where f is fraction of counterion in the Stern layer, $\beta_+^s$ is mobility of the counterion within Stern layer.

According to one aspect, and as appreciated from equations (2) and (3), according to one manner of computing in-phase and quadrature (out-of-phase) conductivity, it is desirable to have a prior knowledge of seven petrophysical parameters ($m_0$, $n_0$, $\phi$, $\rho_g$, $\sigma_w$, $S_w$, CEC) and three electrochemical parameters (f, $\beta_+$, $\beta_+^s$). Among all the parameters, CEC may be considered a key parameter to distinguish amongst different clays, because each clay group has its own CEC values. The remaining petrophysical parameters are routinely estimated during traditional log analysis. The electrochemical parameters may be defined in lab experiments or through log analysis.

Figure 2:
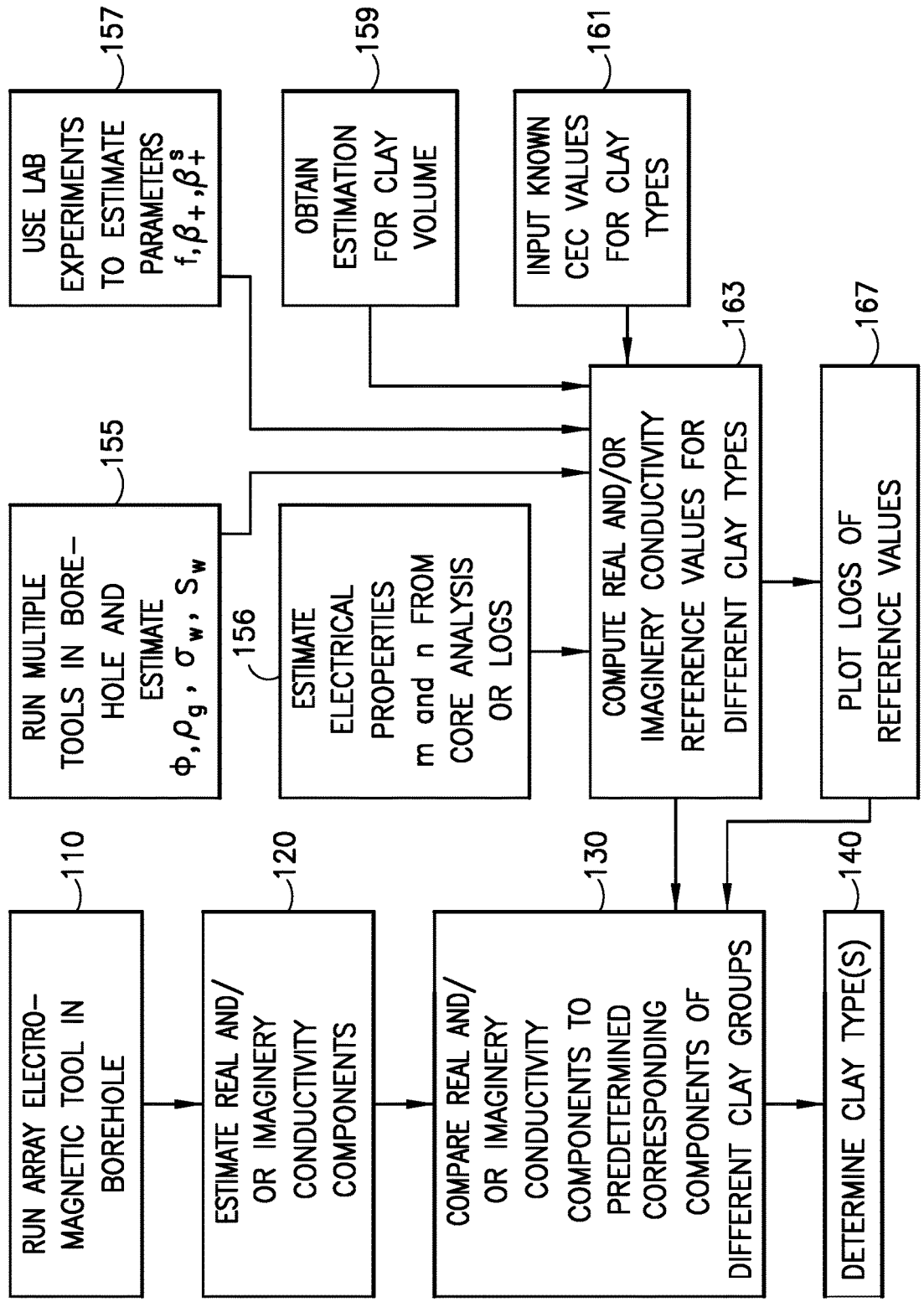
FIG. 2 is a workflow of one embodiment for clay typing.

Turning to FIG. 2, a workflow for clay typing is provided according to one embodiment. In particular, at 110 an array electromagnetic tool such as the AIT tool is run in a borehole traversing a formation and raw data is collected. At 120, estimated real and/or imaginary conductivity components, $\sigma^{R*}$ and $\sigma^{I*}$, are computed from raw AIT data. At 130, the estimated real and/or imaginary conductivity components are compared to real and/or imaginary conductivity components representative of different clay groups. In one embodiment, this comparison may be accomplished by plotting the real and/or imaginary conductivity component values as a function of depth on one or more plots which also provide reference curves or values (logs) for the real and imaginary conductivity component values of different clay groups (as will be discussed hereinafter with respect to FIGS. 3a and 3b). By comparing the $\sigma^{R*}$ and $\sigma^{I*}$ estimated values with the reference ones, clay type determinations may be made at 140. This is particularly the case where the calculated real and/or imaginary conductivity components correspond to either a maximum value or a minimum value (corresponding to smectite or chlorite respectively). According to another embodiment, if the calculated real and/or imaginary conductivity components do not correspond to the maximum or minimum values, they may correspond to values that represent kaolinite or illite. In another embodiment, since the reservoir could contain more than one type of clay, the computed $\sigma^{R*}$ and $\sigma^{I*}$ estimated values may be different than the reference curves for any particular clay group, and the quantities of different clays may be computed as discussed hereinafter.

Returning to FIG. 2, a workflow for generating reference curves for the real and imaginary conductivity component values of different clays is also seen. Thus, at 155, multiple tools such as a neutron-density logging tool, NMR tool and a dielectric tool are run in the borehole traversing a formation over an interval of interest and log analyses are utilized to provide estimates for above-mentioned petrophysical parameters ($\phi$, $\rho_g$, $\sigma_w$, $S_w$) for the logged interval. Rock electrical properties $m_0$ and $n_0$ may be obtained at 156 from lab core analysis or from specialized logs such as dielectric log data for the interval of interest. At 157, lab experiments may be run to estimate electrochemical parameters f, $\beta_+$, $\beta_+^s$ under a lab condition most relevant to the field environment. At 159, logs such as Litho Scanner, or even a gamma ray log and density-neutron logs, may be used to obtain an estimation for clay volume over the interval of interest. Known CEC values from four clay groups (kaolinite, illite, chlorite and smectite) are inputs at 161. With all of the information obtained at 155, 156, 157, 159 and 161, reference $\sigma^R$ and $\sigma^I$ values are computed at 163 utilizing equations (2) and (3), with multiple real and imaginary conductivity reference values being calculated for each location under an assumption that the entire clay volume at that location has only one kind of clay. The multiple reference values may then be plotted at 167 as logs (reference curves) for the interval of interest.

Figure 3A:
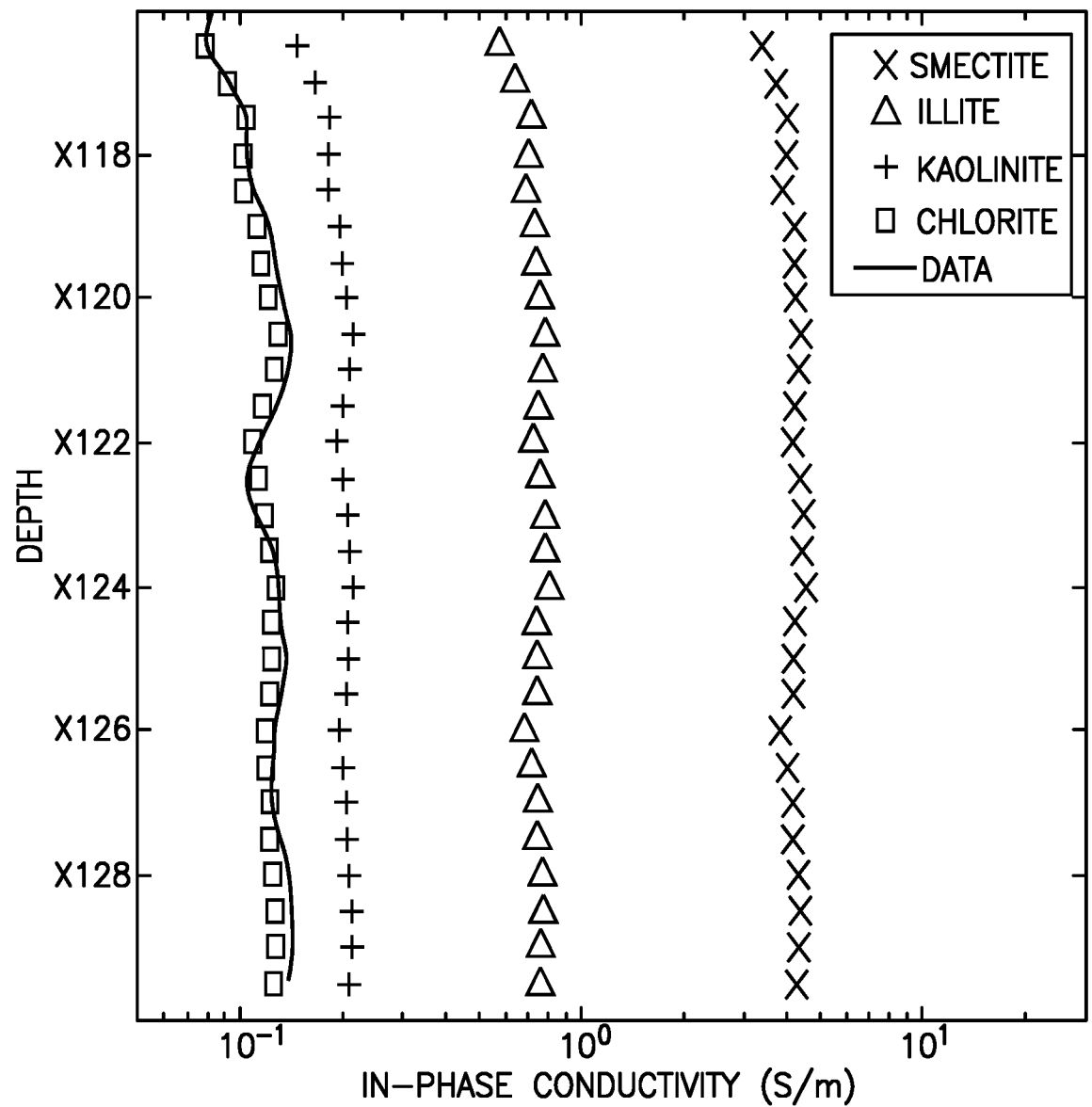
FIGS. 3a and 3b are plots of in-phase conductivity and out-of-phase conductivity respectively for multiple clay groups and for field data.
Figure 3B:
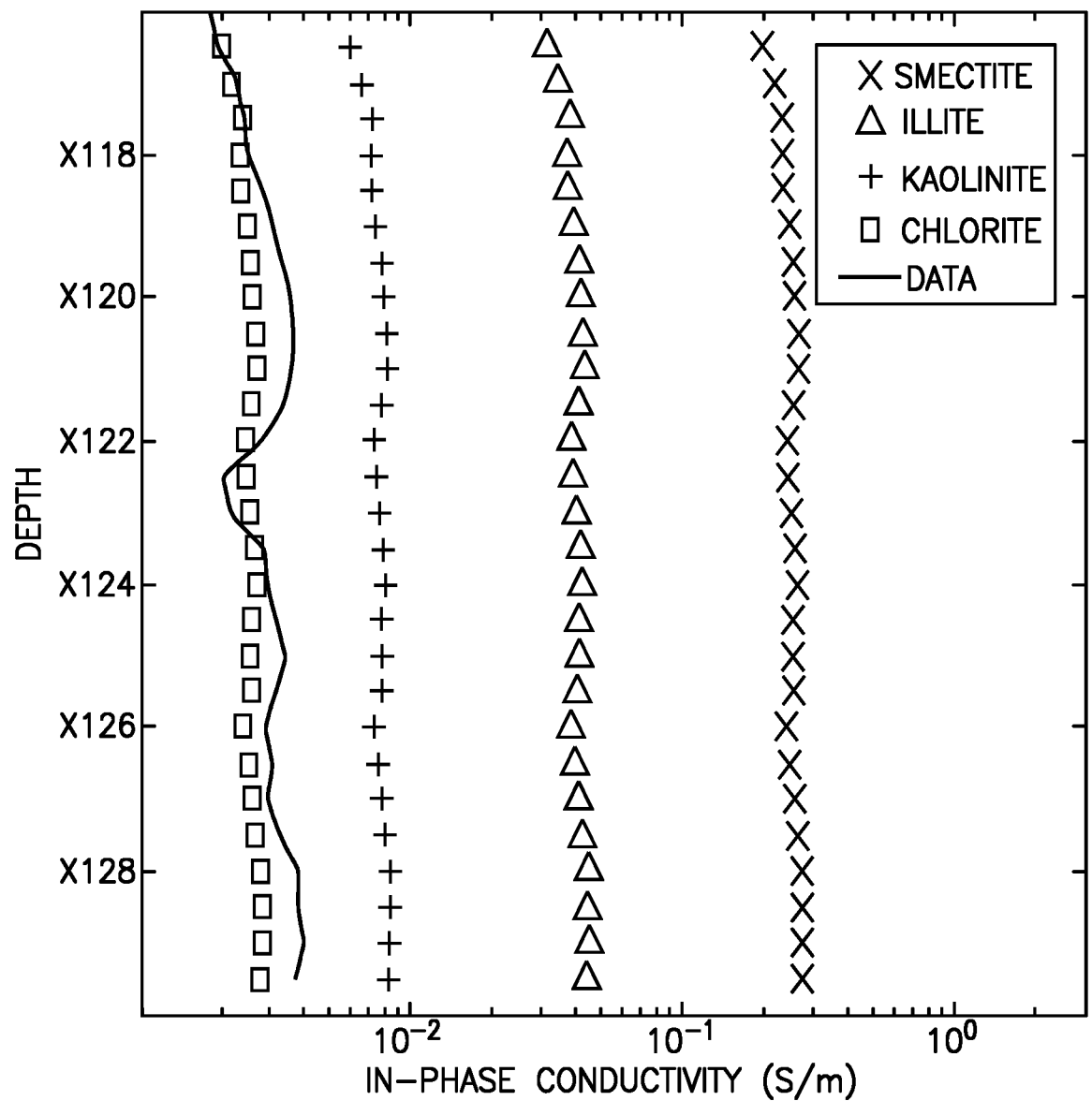

Using actual field data obtained at 155, 157 and 159, multiple reference $\sigma^R$ and $\sigma^I$ values were computed (step 163) utilizing equations (2) and (3) for different clays along the interval of interest, and example reference curves were plotted (step 167) for in-phase conductivity and out-of-phase (quadrature) conductivity for smectite, illite, kaolinite, and chlorite over an interval of interest. The resulting reference curves are seen respectively in FIGS. 3a and 3b. Also shown in FIGS. 3a and 3b are curves (logs) generated by having run AIT logs and collecting raw data (at 110), and estimating (at 120) the real and/or imaginary conductivity components, $\sigma^{R*}$ and $\sigma^{I*}$ along the same interval of interest. A comparison (step 130) of the estimated values generated using the AEM measurements of the AIT tool and the reference curves is seen in both FIG. 3a and FIG. 3b. As will be appreciated by viewing a plot of the estimated data log over the reference logs, the estimated data log tracks the chlorite log closely, suggesting that the clay in the formation over the interval of interest is likely to be chlorite (i.e., the determination of step 140). For this data, the chlorite determination was confirmed by an elemental analysis which revealed that at least 85% of the clay in the interval of interest was chlorite.

According to one embodiment, in comparing the computed $\sigma^{R*}$ and/or $\sigma^{I*}$ curves with the reference $\sigma^R$ and/or the $\sigma^I$ curves a determination can be made that if the computed curve(s) closely track(s) the chlorite reference curve(s), the clay in the formation is chlorite, and if the computed curve(s) closely track(s) the kaolinite reference curve(s), the clay in the formation is likely kaolinite, and if the computed curve(s) closely track(s) the illite reference curve(s), the clay in the formation is likely illite, and if the computed curve(s) closely track(s) the smectite reference curve(s), the clay in the formation is smectite.

According to another embodiment, in comparing the computed $\sigma^{R*}$ and/or $\sigma^{I*}$ curves with the reference $\sigma^R$ and/or the $\sigma^I$ curves a determination can be made that if the computed curve(s) closely track(s) the chlorite reference curve(s), the clay in the formation is chlorite, and if the computed curve(s) closely track(s) the smectite reference curve(s), the clay in the formation is smectite, and if the computed curve(s) do not closely track either the chlorite or smectite reference curves, the clay is assumed to be a mixture of different clays.

In one aspect, the effective CEC value for mixed clays can be calculated based on the following mixing rule formula:

$$CEC = W_{dry\_cl} \Sigma_i w_i CEC_i \qquad (4)$$

where $W_{dry\_cl}$ is the weight fraction of dry clay minerals in the formation, $w_i$ is the relative weight fraction of each dry clay mineral in the clay mix, and $CEC_i$ is the CEC value of each of these dry clay minerals. It is noted that it may be difficult to estimate dry clay volume $V_{dry\_cl}$ from conventional field logs directly without running specialized logs such as LithoScanner. However, it is a common practice and relative easy to estimate wet shale volume $V_{sh}$ from the gamma ray and neutron-density logs as $V_{sh}$ can be calibrated to 100% in pure shale intervals. Shales are dominated by clays and other fine particle minerals such as calcite, feldspar, etc. Dry shale volume $V_{dry\_sh}$ can then be obtained from $V_{sh}$ ($V_{dry\_sh} = V_{sh} - \phi_{sh}$). For local reservoirs, if $V_{dry\_cl}$ data is available from either core analysis such as x-ray diffraction measurement or from specialized logs such as LithoScanner, then localized correlations can be established between $V_{dry\_cl}$ (from core or from specialized logs) and $V_{dry\_sh}$ from conventional logs. With such correlations, $V_{dry\_cl}$ can be obtained from $V_{dry\_sh}$.

The $W_{dry\_cl}$ can be calculated from $V_{dry\_cl}$ using the following formula;

$$W_{dry\_cl} = \frac{\rho_{dry\_cl} V_{dry\_cl}}{\rho_{matrix}(1 - \phi_{total})} \qquad (5)$$

where $\phi_{total}$ is the formation total porosity, $\rho_{matrix}$ is matrix density and $\rho_{dry\_cl}$ is density of dry clay. Since the CEC values ($CEC_i$) for the four clay groups are known, and the total CEC can be obtained from AIT log processing (using the workflow in FIG. 2), equation (4) may be used to find the relative weight fraction of each dry clay mineral in the clay mix ($w_i$) by using least square algorithm to fit the known data to the $\sigma^{R*}$ curve (and/or the $\sigma^{I*}$ curve).

Turning now to FIG. 4, a diagram is provided of an array induction tool 418 deployed in a wellbore 430 traversing a formation 400. The array induction tool 418 is coupled to a processing unit 450 configured to determine the presence of particular clay minerals, according to some embodiments. More particularly, FIG. 4 shows a wireline truck 410 deploying wireline cable 412 into well 430 at a wellsite 420. The array induction tool 418 is disposed on the end of the cable 412 in the subterranean rock formation 400.

According to some embodiments, formation 400 is a clay-containing reservoir formation such as a shaly sand formation. The array induction tool 418, according to some embodiments, is an array induction tool such as Schlumberger's Array Induction Imager Tool which includes an array induction coil transmitter (not shown) and a plurality of array receivers, see (Anderson et al., "Triaxial Induction—A New Angle for an Old Measurement" Oilfield Review (2008)). Data from the interaction of signals from tool 418 with the rock formation 400 are retrieved by the tool 418 and sent to the logging truck 410. According to some embodiments, one or more other tools such as a density tool, a neutron porosity tool, and/or a sonic tool, none of which are shown for clarity, may also be run in well 430 using truck 410.

According to some embodiments, the induction tool data 466 is processed in a data processing unit 450, which can be located in the logging truck 410 or at one or more other locations at or off the wellsite 420. The processing unit 450 is shown in the embodiment of FIG. 4 to include one or more central processing units 444, storage system 442, communications and input/output modules 440, a user display 446 and a user input system 448. Data processing unit 450 can be used for carrying out the processing activity described herein. In some embodiments, the data 466 is combined with other knowledge 468 about the formation 400. By utilizing the array induction tool data 466, and optionally, other knowledge 468 (such as disclosed in co-owned U.S. Publication No. 2018/0100942 which is hereby incorporated by reference herein in its entirety), the processing unit 450 can estimate the real and/or imaginary conductivity components, $\sigma^{R*}$ and/or $\sigma^{I*}$, along the same interval of interest. In addition, the processing unit 450 can compare the $\sigma^{R*}$ and/or $\sigma^{I*}$ values to computed values $\sigma^R$ and/or $\sigma^*$ for a plurality of different clays in order to make a determination of the clay in the formation 400 (output 470). The comparison may be a numerical comparison that generates a clay determination as a function of depth. Alternatively, the processing unit 450 can generate as an output 470 one or more conductivity logs (such as in FIGS. 3a and 3b) which may be compared (e.g., by overlaying) to logs of conductivity representative of various different clays, from which a visual determination may be made. Ultimately, production decisions may be made with respect to hydrocarbons in the formation based on the determination of the particular clay located at locations of interest in the formation.

Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While a limited number of embodiments have been described, those skilled in the art, having benefit of this disclosure, will appreciate that other embodiments can be devised which do not depart from the scope of the invention as disclosed herein. Accordingly, the scope of the invention should be limited only by the attached claims. Moreover, embodiments described herein may be practiced in the absence of any element that is not specifically disclosed herein.

In the claims, means-plus-function clauses, if present, are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method for investigating an earth formation traversed by a borehole for clay types, comprising:
    locating an array electromagnetic tool at at least one location in the borehole;
    activating the array electromagnetic tool to generate a signal that interacts with the earth formation and to collect resulting signals;
    processing said resulting signals with a processor and estimating with the processor a value of at least one of real and imaginary conductivity components, $\sigma^{R*}$ and $\sigma^{I*}$, of the formation adjacent the at least one location in the borehole from said resulting signals;
    comparing the value of the at least one of the real and imaginary conductivity components, $\sigma^{R*}$ and $\sigma^{I*}$, of the formation adjacent the at least one location in the borehole to a corresponding reference value of at least one of real and imaginary conductivity components, $\sigma^{R}$ and $\sigma^{I}$, for a plurality of different clay types, wherein the reference values for the plurality of different clay types are based on field data; and
    from said comparing, determining one clay type belonging to the plurality of different clay types as clay type in the formation adjacent the at least one location in the borehole.

2. The method of claim 1, wherein said comparing comprises:
    plotting the estimated value of the at least one of the real and imaginary conductivity components, $\sigma^{R*}$ and $\sigma^{I*}$, as a function of depth,
    plotting the reference value of the at least one of real and imaginary conductivity components, $\sigma^{R}$ and $\sigma^{*}$, for the plurality of different clay types, and
    comparing the resulting plots.

3. The method of claim 2, wherein said plurality of different clay types includes at least smectite and chlorite.

4. The method of claim 3, wherein said plurality of different clay types further includes kaolinite and illite.

5. The method of claim 2, wherein said processing comprises estimating with the processor values of both said real and imaginary conductivity components, $\sigma^{R*}$ and $\sigma^{I*}$, of the formation adjacent the at least one location in the borehole, and said comparing comprises comparing the values of both said real and imaginary conductivity components $\sigma^{R*}$ and $\sigma^{I*}$, of the formation adjacent the at least one location in the borehole with corresponding references values of both the real and imaginary conductivity components, $\sigma^{R}$ and $\sigma^{I}$, for the plurality of different clay types.

6. The method of claim 5, wherein said plurality of different clay types includes at least smectite and chlorite.

7. The method of claim 6, wherein said plurality of different clay types further includes kaolinite and illite.

8. The method of claim 1, wherein a value of the real conductivity component $\sigma^{R*}$ is estimated based on a relation to a number of parameters that include $S_w$ representing water saturation, $n_0$ representing a saturation exponent, $\sigma_w$ representing formation water conductivity, $\rho_g$ representing matrix grain density, CEC representing cation exchange capacity, $\beta_+$ representing counterion mobility in formation fluid, and F representing an electric formation factor defined according to $F=\phi^{-m_0}$, where $\phi$ represents porosity and $m_0$ represents a cementation exponent.

9. The method of claim 8, wherein a reference value of the real conductivity component $\sigma^{R}$ for a given clay type is based on a relation to a number of parameters that include $S_w$ representing water saturation, $n_0$ representing a saturation exponent, $\sigma_w$ representing formation water conductivity, $\rho_g$ representing matrix grain density, CEC representing cation exchange capacity, $\beta_+$ representing counterion mobility in formation fluid, and F representing an electric formation factor defined according to $F=\phi^{-m_0}$, where $\phi$ represents porosity and $m_0$ represents a cementation exponent.

10. The method of claim 1, wherein a value of the imaginary conductivity component $\sigma^{I*}$ is estimated based on a relation to a number of parameters that include $\beta_+^s$ representing counterion mobility in a Stern layer, f representing a fraction of counterions in the Stern layer, $\rho_g$ representing matrix grain density, $S_w$ representing water saturation, $n_0$ representing a saturation exponent, and CEC representing cation exchange capacity.

11. The method of claim 10, wherein a reference value of the imaginary conductivity component $\sigma^{I}$ for a given clay type is based on a relation to a number of parameters that include $\beta_+^s$ representing counterion mobility in a Stern layer, f representing a fraction of counterions in the Stern layer, $\rho_g$ representing matrix grain density, $S_w$ representing water saturation, $n_0$ representing a saturation exponent, and CEC representing cation exchange capacity.

12. The method of claim 1, wherein the field data is derived from multiple well logging tools.

13. The method of claim 12, wherein the multiple well logging tools include a neutron-density logging tool, an NMR tool and a dielectric tool.

14. The method of claim 1, wherein the field data is derived from lab core analysis.

15. The method of claim 1, wherein the field data is derived from at least one logging tool selected from group consisting of a dielectric logging tool, a lithographic logging tool, a gamma ray logging tool, and a density-neutron logging tool.

16. A method for investigating an earth formation traversed by a borehole for clay types, comprising:
  locating an array electromagnetic tool at at least one location in the borehole;
  activating the array electromagnetic tool to generate a signal that interacts with the earth formation and to collect resulting signals;
  processing said resulting signals with a processor and determining with the processor a total CEC representing cation exchange capacity of the formation adjacent the at least one location in the borehole from said resulting signals;
  processing said resulting signals with a processor and estimating with the processor a value of at least one of real and imaginary conductivity components, $\sigma^{R*}$ and $\sigma^{I*}$, of the formation adjacent the at least one location in the borehole from said resulting signals; and
  determining relative fractions of different clay types in the formation adjacent the at least one location in the borehole using the total CEC representing cation exchange capacity of the formation adjacent the at least one location in the borehole as well as the value of the at least one of the real and imaginary conductivity components, $\sigma^{R*}$ and $\sigma^{I*}$, of the formation adjacent the at least one location in the borehole.

17. The method of claim 16, wherein the total CEC representing cation exchange capacity of the formation adjacent the at least one location in the borehole is related to relative fractions of different clay types in the formation adjacent the at least one location in the borehole based on a mixing rule formula of the form $$CEC = W_{dry\_cl} \Sigma_i w_i CEC_i,$$

where CEC is the total CEC representing cation exchange capacity of the formation, $W_{dry\_cl}$ is the weight fraction of dry clay minerals in the formation, $w_i$ is the relative weight fraction of each clay type component, and $CEC_i$ is the CEC value of each one of these clay type components.

18. The method of claim 17, wherein $W_{dry\_cl}$ is based upon a dry shale volume determined from wet shale volume.

19. The method of claim 18, wherein $W_{dry\_cl}$ is calculated from a dry shale volume $V_{dry\_cl}$ based on a formula of the form $$W_{dry\_cl} = \frac{\rho_{dry\_cl} V_{dry\_cl}}{\rho_{matrix}(1 - \emptyset_{total})},$$

where $\emptyset_{total}$ represents formation total porosity, $\rho_{matrix}$ represents matrix density, and $\rho_{dry\_cl}$ represents density of dry clay.

20. The method of claim 16, wherein the determining the relative fractions of different clay types in the formation adjacent the at least one location in the borehole fits the value of at least one of the real and imaginary conductivity components, $\sigma^{R*}$ and $\sigma^{I*}$, of the formation adjacent the at least one location in the borehole to known data.

* * * * *

UNITED STATES PATENT AND TRADEMARK OFFICE
CERTIFICATE OF CORRECTION

PATENT NO. : 10,866,335 B2  
APPLICATION NO. : 16/041454  
DATED : December 15, 2020  
INVENTOR(S) : Ping Zhang et al.

Page 1 of 1

It is certified that error appears in the above-identified patent and that said Letters Patent is hereby corrected as shown below:

On the Title Page

Item [73], should read:  
Schlumberger Technology Corporation, Sugar Land, TX  
Saudi Arabian Oil Company, Dhahran, Saudi Arabia Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*